June 21, 1960     J. S. WARHURST     2,942,235

WARNING SYSTEM FOR AUTOMOBILE LIGHTING CIRCUITS

Filed Sept. 13, 1957

INVENTOR
JOSEPH S. WARHURST

BY *Leech & Radue*

ATTORNEYS

United States Patent Office 2,942,235
Patented June 21, 1960

2,942,235

WARNING SYSTEM FOR AUTOMOBILE LIGHTING CIRCUITS

Joseph S. Warhurst, % The Joseph S. Warhurst Company, Clinton, Conn.

Filed Sept. 13, 1957, Ser. No. 683,778

6 Claims. (Cl. 340—52)

This invention relates to warning devices for automobile lighting circuits and more particularly to apparatus for automatically warning the operator of a motor vehicle, at the time the ignition is switched off, that the lights are lighted in order that he may not leave the vehicle unaware that the lights are burning and so deplete the storage battery.

It is the general object of the present invention to provide a novel and improved warning device for automobile lighting circuits.

More particularly it is an object of the invention to provide, in connection with the conventional lighting and ignition circuits of an automobile or similar motor vehicle, a warning device actuated from the vehicle battery and so connected that it goes into operation if the ignition switch is turned off while the lighting circuit is closed. Such a device may be equipped with a manually actuated signal silencer.

It is a further object of the invention to equip the apparatus with a self-resetting feature so that the next time the automobile is operated, the warning device will sound if the lights are left on when the ignition is turned off in spite of its having been silenced in the previous operation.

It is a still further object of the present invention to provide circuit interrupting and signaling device means to warn that automobile lights are on when the ignition is off in which a core is equipped with a hinged armature biased away from the core, a stationary contact and an armature-carried contact engaged by the stationary contact when the armature is so biased, together with a winding on the core arranged to be energized from the battery of a vehicle when the ignition switch thereof is closed or when the lighting switch remains closed after the ignition switch is opened, the circuits being arranged in such manner that under the last mentioned circumstances the contacts are vibrated and the armature produces a warning buzz.

Other and further objects and features of the invention will be more apparent to those skilled in the art upon a consideration of the following specification and accompanying drawings in which are disclosed two exemplary embodiments of the invention, with the understanding that such changes and modifications may be made therein as fall within the scope of the appended claims without departing from the spirit of the invention.

In the operation of more or less conventional automotive vehicles during periods requiring the same to be lighted, the operator often forgets to turn off the lights, even though he has shut off the ignition in order to stop the engine, the noise of the engine having served as a warning over and above the necessity to remove his keys which control the ignition circuit. If this happens and the vehicle is left for a considerable period of time there is grave danger of depleting the storage battery needed for starting and ignition as well as lighting and it is the purpose of the present invention to provide apparatus which automatically warns the operator by an audible signal that the lights are still lighted should the ignition be turned off at the time.

Figure 6:
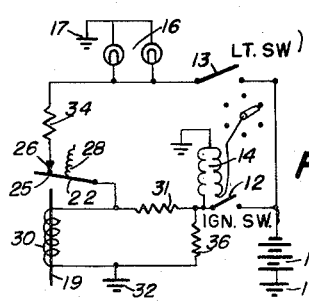
Figure 6 is a schematic or wiring diagram of a warning device according to one embodiment of the present invention and associated with the ignition and lighting circuits of an automotive type vehicle.
Figure 5:
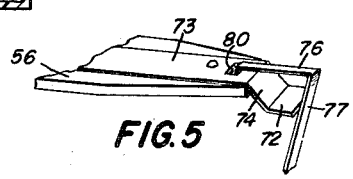
Figure 5 is a view similar to Fig. 4 but showing the armature in the latched position.
Figure 7:
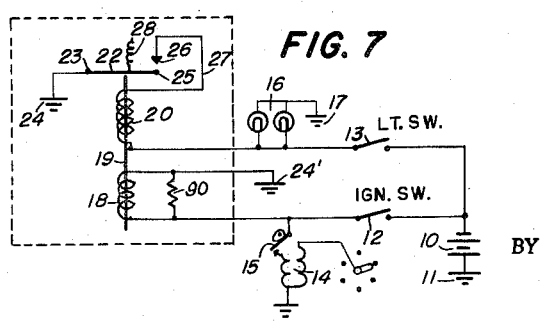
Figure 7 is a view similar to Fig. 6 but showing a modified or two coil warning device.

The invention is susceptible to several embodiments two of which are illustrated in the complete systems of Figures 6 and 7. In these two figures the automobile battery is indicated at 10, grounded at 11 in the conventional manner and adapted to be connected through switch 12 to conventional ignition apparatus indicated generally by the reference character 14 and including the two-winding spark coil, distributor and spark plugs. The primary winding of the coil is shown as grounded to complete the circuit thereof when the switch 12 is closed, it being understood that there is a conventional interrupter in this circuit as roughly depicted at 15 in Figure 7.

The lighting circuit illustrated at 16 is merely conventional and is shown grounded at 17 to complete the electric circuit. It is under the control of the switch 13. Either of the ignition and lighting circuits may be closed by actuation of its respective switch and when each of these switches is closed certain other circuits are energized as will now be pointed out, first in connection with Figure 7 the so-called two winding circuit. Here one winding 18 on a magnetic core 19 is connected in parallel to the ignition circuit so as to be energized whenever the switch 12 is closed while a second winding 20 on the same core is connected in parallel to the lighting circuit to be energized under certain circumstances when the switch 13 is closed. Mounted for attraction by the core 19 is the armature 22 pivoted at 23 and grounded at 24 and having mounted on its free end a contact 25 for cooperation with its stationary contact 26 connected by conductor 27 to one end of the winding 20. A spring 28 tends to maintain the contacts 25 and 26 in engagement unless the winding 20, 18 or both are energized.

Considering now the operation of the arrangement illustrated in Figure 7 it will be noted that if switch 12 is closed to energize the ignition of the motor vehicle, the winding 18 is also energized, it being grounded at 24'. Under these circumstances the armature 22 is attracted to the core and held there, separating the contacts 25 and 26. Should it now be desired to light the vehicle lights, the switch 13 is closed energizing the lighting circuit 16 and applying voltage to one end of the winding 20 but the other end being separated from ground by the open contacts prevents the coil from being energized so that the lights of the vehicle operate at the same time that the motor is in use. Should the vehicle be stopped and the switch 12 opened to stop the operation of the motor without turning off the lights the coil 18 will be de-energized so that contacts 25 and 26 now engage under the action of spring 28 and coil 20 becomes energized through switch 13, immediately drawing the armature 22 down against the core, opening the contacts 25 and 26 de-energizing the core 19. Immediately the spring 28 recloses the contacts, the core is re-energized and the armature motion repeated at a high rate of speed, depending on its weight and other factors, and a loud buzzing noise is given off warning the operator of the vehicle before he can alight, that the lights are still turned on. At this point he can either open the light switch if he so desires or operate mechanism which disables the vibrating interrupter 22, 25, 26 by means which will be later described.

In the single winding device illustrated in Figure 6 the parts common to this circuit and Figure 7 have been given the same numbers and here it will be noted that there is but a single winding 30 on the magnetic core 19 and that the armature and its contacts have the same mechanical arrangement as in Figure 7.

When switch 12 is closed winding 30 is energized through the 90 ohm resistor 31 and ground at 32, the winding being shown as having a 90 ohm resistance. This reduces the current drawn by the magnet to less than that of a small dash lamp. The armature is attracted with a single click and remains positioned to keep the contacts 25 and 26 open.

If, under the circumstances previously described in connection with Figure 7, the lighting switch 13 is closed, lights 16 will be energized through their ground 17, but since the contacts 25 and 26 are already separated by the attraction of the armature through the energization of coil 30 through switch 12, the auxiliary circuit to the lighting system will not be energized. If, however, the ignition switch is now opened, current will be momentarily cut off from coil 30, the contacts immediately close at 25, 26 and coil 30 is re-energized through switch 13 and resistor 34 and the armature is attracted which opens the circuit, and the buzzing as described in connection with the other embodiment takes place and can in a like manner be stopped by latching down the armature as will be later described.

The amount of current flowing during the buzzing operation is kept down by the 50 ohm resistor 34, and the 90 ohm resistor 31 in conjunction with resistor 36 prevents the energization of the ignition coil by way of switch 13, resistor 34, armature 22 and resistor 31, to a sufficient degree to actuate the ignition of the motor. In order that the curent collapsing in coil 30 when its circuit is opened at contacts 25 and 26 may not energize the ignition circuit sufficiently to actuate it, the resistor 36 forms a closed circuit with this winding and serves to discharge the coil during its buzzing operation.

It will be seen that the network of resistors serves several purposes, first to isolate the ignition and lighting circuits even though but a single winding exists on the magnet which actuates the armature, (2) to permit this winding to be actuated from either circuit and (3) to hold down the overall current drain chargeable against the warning system to not more than the amount of current used by a small pilot or dash lamp.

Referring now to Figures 1 to 5, inclusive, the mechanical construction of the magnet-vibrator unit is such that but minor changes are required for the purpose of adapting it for use with either the circuit of Figure 6 or Figure 7. The most important change, of course, is that two windings rather than one are placed on the core and that in the embodiment for Figure 7 the armature is grounded, while in the embodiment for Figure 6 it is not, and the armature and its spring must be insulated from the frame.

Figure 2:
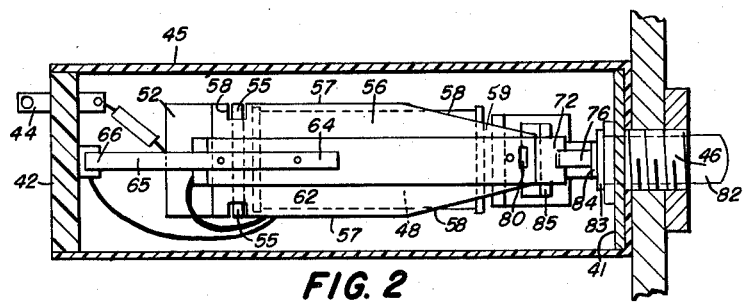
Figure 2 is a top plan view thereof, in common with Fig. 1 showing the armature released for signalling.
Figure 3:
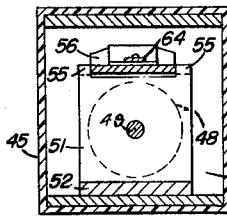
Figure 3 is a transverse section through the device taken on line 3—3 of Fig. 1.

The buzzer magnet-vibrator unit may take most any form but in the present instance is made up to be mounted behind the dash of a motor vehicle and hence is elongated and of minimum width and height. Conveniently it is housed in a U-shaped frame 40 of non-magnetic metal having parallel top and bottom elements and a front element 41. Closing the rear end is an insulating plate or panel 42 secured between the ends of the upper and lower members of the frame by means of screws as shown at 43. It may contain various circuit elements, connectors and the like such as shown, for instance, at 44 to suit the needs and whims of the manufacturer and the circuits. In lieu of using the screws 43, these may merely be push pins and be held in position after the device is assembled by sliding over the same, a rectangular tubular cover of non-magnetic metal 45 for the front end, the top and bottom and closing the sides as seen in Figures 2 and 3. It leaves exposed only the insulating panel 42 and the threaded mounting sleeve 46 extending from the end member 41 and adapted to pass through the dash or other suitable panel and be secured therein by means of a nut threaded on to its exterior surface in a well known manner.

The magnet winding is cylindrical as shown at 48 about a core 49 whose ends are attached by screws, as shown, to magnetic pole pieces 50 and 51 at opposite ends thereof, and having feet 52 attached by screws as shown to the lower member of the U-shaped metal frame.

The pole piece 50 has its upper edge flat and horizontal as seen at 53, but pole piece 51 has a flat intermediate section and upwardly projecting end lugs 55, as seen in Figures 2 and 3. The armature plate 56 is formed of magnetic material to the shape shown and has parallel sides 57 for a portion of its length which are notched at 58 to be received between the prongs 55 on pole piece 51. This forms a hinge structure permitting limited movement of the tapered free end 59 for cooperation with the flat face 53 on the forward pole piece but extending beyond the same for purpose to be later described.

Figure 1:
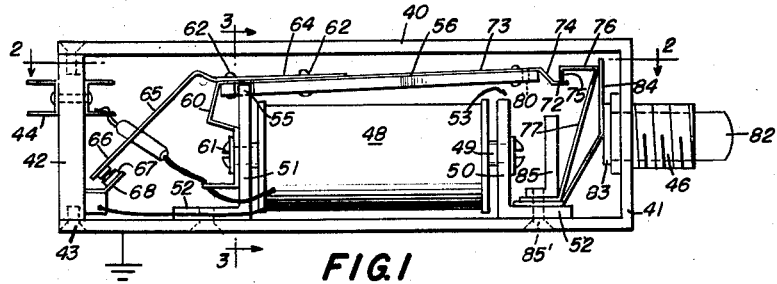
Figure 1 is a side elevation of a warning device constructed in accordance with the present invention, the outer cover being omitted.

The armature is maintained in position on its hinge combination 55, 58 and urged to an open position with the narrow end remote from the pole piece 53 by means of a shaped flat spring 60, one end of which is secured under the screw 61 attaching the core 49 to the pole piece 51. The metal of the spring overlies the armature for its full length and is attached thereto by rivets 62 at the left end of the armature. The portion of the spring which extends over the top of the armature is overlapped by a part 64 of the contact carrying arm 65 which extends outwardly beyond the hinge end of the armature and is bent downwardly to an angle of about 45° to carry on its free end a contact button 66 for engagement with stationary contact button 67 positioned by rigid arm 68 from the insulating panel 42, the arrangement being such that the contacts are engaged when the armature at its forward end is lifted well above the surface 53 of the forward pole piece as shown in Figure 1.

Figure 4:
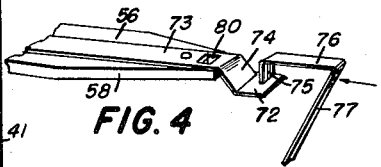
Figure 4 is a fragmentary perspective view of the latch and of the warning device armature showing details of the latch-mechanism which is arranged in the "release" position.

The portion of the spring 65 extending over the armature, as shown, to form a rigid latch element, includes the flat portion 73 engaging the upper face of the armature and secured thereto by the non-magnetic rivet shown whose under head prevents the armature sticking to the pole piece, a ramp portion 74 inclined outwardly and downwardly beyond the armature end, and a flat platform section 72. This overhang is adapted to cooperate with the downwardly directed portion 75 formed integral with the horizontal section 76 and the upwardly inclined portion 77 of a spring-like latch member, which, in the position shown, limits the upward movement of the armature as shown in Figures 1 and 4. The movable latch part is adapted to be pushed toward the left so that the depending section 75 engages the ramp 73 and lowers the armature, but not sufficient for it to strike the pole piece 53. Continued movement of the latch part causes the depending portion 75 thereof to drop into the aperture 80 in the portion 73, which for security may also extend into the metal of the armature, whereby the armature is locked in a partially retracted position to hold the contacts 66 and 67 separated thereby to eliminate the buzzing action of the mechanism, as described in connection with Figures 6 and 7, when it is desired to leave the lights on in spite of the ignition being turned off. This opens the circuit between the two contact buttons and de-energizes the magnet winding should it be connected to the battery through switch 13.

The latch is adapted to be moved toward the left to achieve the condition just described by means of a push button 82 slidable in the externally threaded sleeve 46 and having an enlarged inner head 83 which engages against push-button return spring 84 of greater strength than the latch spring and having with that spring a foot section. These two foot sections overlap, bear on the base 52 of the right pole piece 50 and are held down by the base of the L shaped stop member 85 secured by the screw 85' which holds the pole piece in position. This stop member limits the inward movement of the push button so that the springs cannot be damaged by an overstroke thereof. The push button return spring 84 is so shaped and biased that it returns to the position shown in Figure 1 with considerable force insuring the push button remaining exposed for operation as desired.

After the push button has been pressed to lower the armature part way and engage the portion 75 in the recess 80 in the armature the lights may be left on, as explained, without buzzing but should the ignition now be turned on the armature moves down under the energization of the magnet winding therefrom until it engages the face 53 of the pole piece. This movement releases the spring part 75 which returns to the position shown in Figure 4, conditioning the apparatus for further normal operation to give a signal that the lights are on when the ignition is off should this condition be repeated. This insures against the necessity for any positive action on the part of the vehicle operator to re-establish the signal system after it has been locked out of position by pushing the push button.

In the embodiment illustrated in Figure 7, the two-winding device, the two coils serve to isolate the ignition from the lighting circuit and permit connecting the armature contact spring to the frame, saving the cost of providing insulation at this point. In the embodiments of Figure 6 insulation must be provided so that the armature is not grounded. This can be arranged in any obvious manner. In Figure 7 the resistor 90 is shown bridging the ignition winding 18 on the buzzer magnet and serves to diminish the voltage developed across this winding by transformer action when the device is buzzing. Without this resistor enough voltage might be furnished to the engine ignition to keep the motor running even though the ignition switch is turned off. This resistor can be of about 100 ohms value which provides a negligible drain on the car battery when the ignition is on. The embodiment of Figure 7, like that of Figure 6, requires only two insulated leads to connect to the automobile electrical system for the metallic frame mounting provides the ground return.

The apparatus of the invention is simple, cheap and effective as well as wholly automatic in operation, requiring only action on the part of the user should he desire to ignore its warning.

Having thus described my invention, what I claim as novel and desire to secure by Letters Patent of the United States is:

1. In a warning system for automobile lighting circuits, the combination with a source of current, ignition apparatus connected to said source through a switch and lighting means connected to said source through a second switch; of a magnetic core having electric winding means thereon adapted for energization to magnetize the same, an armature spring-biased away from the core and adapted to be attracted on winding energization, a pair of normally closed contacts mounted to be opened by said armature when attracted toward the core, a circuit connected to energize winding means when the ignition switch is closed, a second circuit adapted to energize winding means through said contacts when the lighting switch is closed, and manually operable means arranged to mechanically engage and move said armature partially toward said core to open said contacts, and interengaging means on said armature and manually operable means to retain the armature in contact opening position.

2. The system of claim 1 in which said manually operable means is spring biased toward armature release position, said interengaging means comprising a latch acting between the armature and manually operable means and resisting said bias, said latch being so constructed as to be released on further movement of the armature toward the core when the latter is energized by closing the ignition switch.

3. In a warning system for automobile lighting circuits, the combination with a source of current, ignition apparatus connectible to said source through a switch and lighting means connectible to said source through a second switch; of a magnetic core, an armature spring-biased away from the core, a winding on said core adapted to be connected to said source through said first switch, a second winding on said core adapted to be connected to said source through the second switch, either winding when energized being capable of magnetizing said core to attract said armature, a pair of normally closed contacts mounted to be opened by the armature when moved toward said core, a return circuit for the first winding directly to said source, a return circuit for the second winding through said contacts to said source, manually operable means engageable with said armature to move it partially toward said core to open said contacts, latch means to automatically engage and hold said armature in said contact open position, and said latch means being constructed to automatically release said armature when the first winding is energized to attract the armature further toward said core.

4. The system of claim 3 in which said first winding is shunted by a resistance of such size as to prevent operation of the ignition system through transformer action when the second winding is intermittently energized due to the interrupter action of said contacts.

5. In a warning system for automobile lighting circuits, the combination with a source of current ignition apparatus connectible to said source through a switch and lighting means connectible to said source through a second switch; of a magnetic core, an armature hinged at one end and having the opposite end spring biased away from the core, a winding on said core adapted to be connected to said source through either of said switches to attract the armature to the core, a pair of normally closed contacts mounted to be opened by the armature when moved toward said core, said contacts being in circuit between only the second switch and said winding, a return circuit for the opposite end of said winding to said source, a resistor between the ignition apparatus and said winding a resistor connecting the switch end of said ignition apparatus to ground, a projection on the opposite end of the armature providing a ramp, a latch-opening at the upper level of the ramp and a stop at the lower level of the ramp, a spring having a fixed end and a hooked end normally overlying said stop to limit the movement of the armature away from the core and a push button positioned to move said spring along the ramp to move the armature toward the core and to cause the said hooked end to enter said latch opening and hold the armature partially toward the core.

6. A system for warning that one of a pair of electric circuits is closed when the other has been opened, in combination, energizing means, each circuit being connectible to said means through an independent switch, a magnetic core having winding means thereon, an armature, hinged at one end and having the other end spring-biased away from said core and adapted to be attracted on winding energization, a pair of normally biased-closed contacts mounted to be opened by said armature when moved toward said core, a subsidiary circuit arranged for energization parallel to each of said electric circuits and including said winding means, one of said subsidiary circuits having said contacts in series therein, whereby the armature is vibrated if only the other circuit is open, a latch recess in said other end of said armature, a ramp on said armature leading to said recess, a spring latch having a fixed end and a hook end biased away from said recess, manual means to move said hook end toward said recess over said ramp to thereby move the armature's other end toward said core whereby said latch enters the recess to hold the armature, said latch being released when the armature is fully attracted by energizing the other circuit.

References Cited in the file of this patent

UNITED STATES PATENTS

| | | |
|---|---|---|
| 2,101,407 | Morland | Dec. 7, 1937 |
| 2,581,338 | La Roza | Jan. 8, 1952 |
| 2,742,630 | Muncheryan | Apr. 17, 1956 |
| 2,756,408 | McKaig | July 24, 1956 |
| 2,759,176 | Kennedy | Aug. 14, 1956 |
| 2,780,797 | Gooding | Feb. 5, 1957 |
| 2,788,514 | Schmitt | Apr. 9, 1957 |
| 2,799,843 | Savino | July 16, 1957 |
| 2,816,191 | Epstein | Dec. 10, 1957 |
| 2,816,977 | De Kramer | Dec. 17, 1957 |